United States Patent
Flohr et al.

[11] Patent Number: 5,796,803
[45] Date of Patent: Aug. 18, 1998

[54] METHOD FOR IMAGE RECONSTRUCTION IN A COMPUTED TOMOGRAPHY APPARATUS

[75] Inventors: Thomas Flohr, Uehlfeld; Stefan Schaller, Erlangen, both of Germany

[73] Assignee: Siemens Aktiengesellschaft, Munich, Germany

[21] Appl. No.: 850,685

[22] Filed: May 2, 1997

[30] Foreign Application Priority Data

May 2, 1996 [DE] Germany ............. 19617609.3
Mar. 21, 1997 [DE] Germany ............. 19711963.8

[51] Int. Cl.[6] .................................................. A61B 6/03
[52] U.S. Cl. .................................................. 378/15; 378/901
[58] Field of Search ........................................ 378/15, 901

[56] References Cited

U.S. PATENT DOCUMENTS

| | | | |
|---|---|---|---|
| 4,991,093 | 2/1991 | Roberge et al. | 382/131 |
| 5,406,479 | 4/1995 | Harman | 378/7 |
| 5,625,660 | 4/1997 | Tuy | 378/15 |

FOREIGN PATENT DOCUMENTS 0 430 549  5/1991  European Pat. Off. .
WO95/12353  11/1995  WIPO .

OTHER PUBLICATIONS

"The Gridding Method For Image Reconstruction By Fourier Transformation, " Schomberg et al, IEEE Trans. On Med. Imaging, vol. 14, No. E, Sep. 1995, pp. 596–607.

Primary Examiner—David P. Porta
Assistant Examiner—David Vernon Bruce
Attorney, Agent, or Firm—Hill & Simpson

[57] ABSTRACT

In an approximative image reconstruction method for a computed tomography apparatus with a multi-row detector in spiral operation, a reinterpolation from fan data to parallel data (rebinning) is first carried out independently for all rows of the detector. With the parallel data, an image is reconstructed by having each beam contribute to the image with a weight that depends on the respective distance of the beam to the image plane. Each beam thereby receives a weight that, in general, changes along the beam. By approximating these weighting functions by a short Fourier series, an efficient Fourier reconstruction results.

1 Claim, 3 Drawing Sheets

METHOD FOR IMAGE RECONSTRUCTION IN A COMPUTED TOMOGRAPHY APPARATUS

BACKGROUND OF THE INVENTION

1. Field of the Invention

The present invention is directed to a method for image reconstruction in a computed tomography apparatus with two-dimensional detector array.

2. Description of the Prior Art

Computed tomography systems are known in which a two-dimensional X-ray detector is provided that is formed by a matrix of detector elements. The matrix is accordingly constructed from a series of rows, with each row containing a series of detector elements. The detector is struck by a pyramid-shaped X-ray beam bundle, and enables the simultaneous scanning of several layers, dependent on the extent of the detector in the z-direction, i.e., in the direction of the system axis around which the measurement system, consisting of the X-ray source and the detector, is rotated. For scanning a volume of the examination subject, the measurement system rotates continuously around the system axis, while a relative motion of the examination subject with respect to the measurement system ensues in the direction of the system axis.

For image reconstruction from data of a spiral scanner with a single row of detector elements, various methods are known in the literature. For example, in European Application 0 430 549 a method is disclosed in which an interpolation is carried out in the direction of the z axis, by calculating the weighted sum of the contributing beams, with the weights depending on the distance of the beams to the imaging plane. Due to the inclination of the beams by their cone angle, in a multi-row detector the distance of a beam to the imaging plane is not constant over the entire beam, but instead becomes a function of the observed position along the beam. It is thus necessary to carry out the spiral interpolation in the back-projection for each voxel individually. The cone beam back-projection required for this, however, has a very high computing expense. In German OS 44 38 988, instead of a cone beam back-projection, a weighting of the individual detector rows, with subsequent standard back-projection is proposed. The cone angle of the beams is, however, neglected, and this results in a loss of z-sharpness and an increase in cone beam artefacts.

SUMMARY OF THE INVENTION

An object of the present invention is to provide a method for image reconstruction in a multi-row computed tomography apparatus in spiral operation that enables a precise image reconstruction in a short time.

The inventive method enables the inclination of the beams (cone angle) to be taken into account, without requiring a cone beam back-projection.

The above object is achieved in an approximative image reconstruction method for a computed tomography apparatus in accordance with the principles of the present invention wherein the apparatus has an X-ray arrangement which produces a pyramid-shaped X-ray beam bundle which strikes a detector, the X-ray arrangement and the detector being operated to conduct a spiral scan of an examination subject in order to produce spiral multi-row data. A reinterpolation of the fan data to parallel data (rebinning) is initially conducted independently for all rows of the detector. Using the parallel data, an image is reconstructed with each beam of the beam bundle contributing to the image with a weight that depends on the distance of that beam to the image plane, these respective distances being different for the respective beams. Each beam thus receives a weight which, in general, varies along the longitudinal direction of the beam so that each beam receives a weight in the form of a weighting function. By approximating these weighting functions using a short Fourier series, a Cartesian frequency grid for the transformed data is produced, and this grid is then subjected to a back-transformation into the spatial domain in order to produce an image of the examination subject.

The inventive method is an approximative method, and presents a very efficient implementation as a Fourier reconstruction. This procedure avoids the incorrect change in order of z interpolation and convolution in the final equation used for producing a standard parallel back-projection image, and allows the angle of inclination of the beams to be taken into account, without requiring an expensive cone beam back-projection.

DESCRIPTION OF THE PREFERRED EMBODIMENTS

Figure 1:
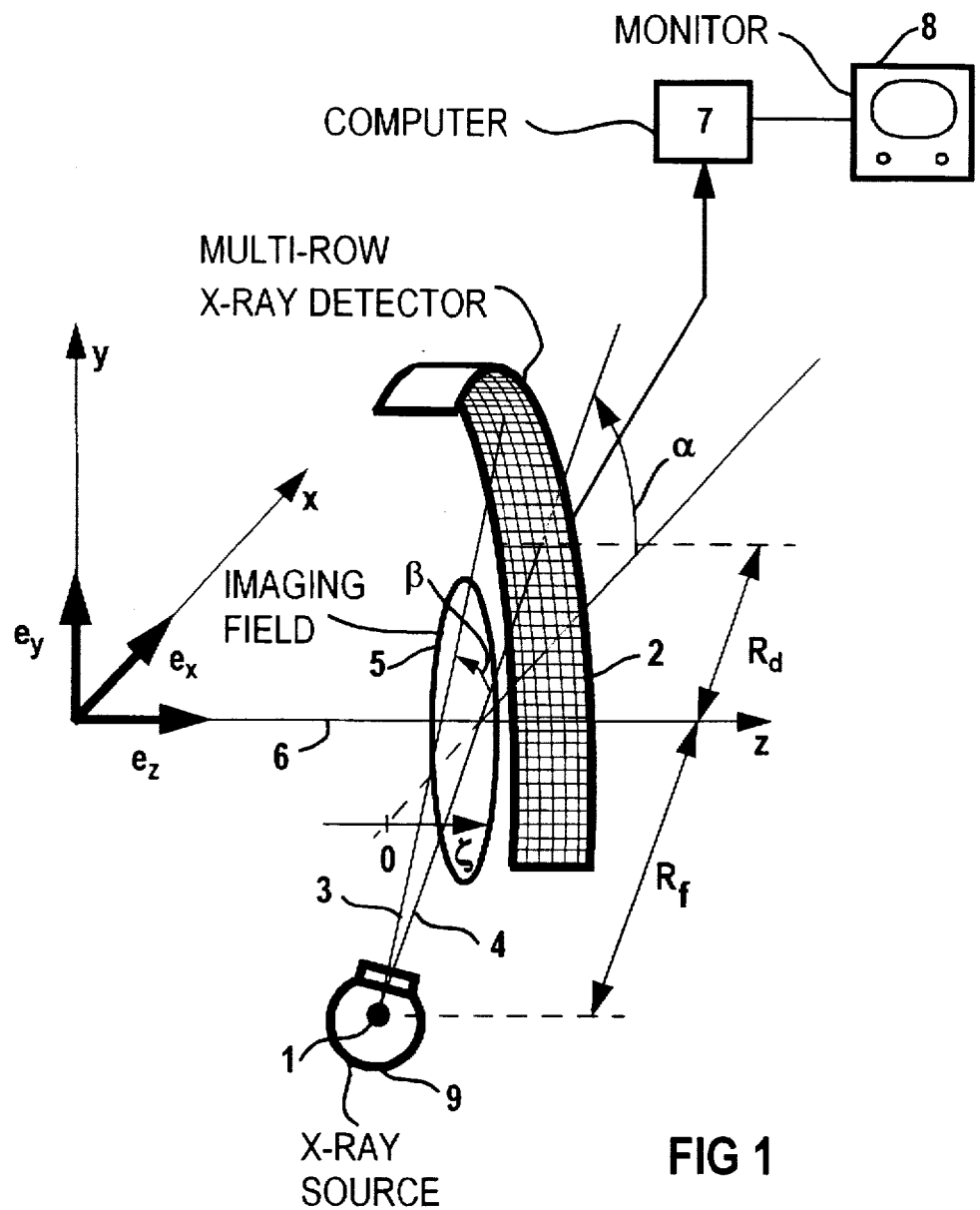
FIG. 1 shows the basic components of a computed tomography apparatus, for explanation of the concept of the invention.

The computed tomography apparatus in FIG. 1, an X-ray source 9 with a focus 1, and a detector 2. The detector 2 is formed by a series of parallel rows, each containing a series of detector elements. A primary beam diaphragm produces a pyramid-shaped X-ray beam bundle, which strikes a detector 2 precisely. Of this X-ray beam bundle, in FIG. 1 only the middle beam 4 and an additional beam 3 are shown as examples. For scanning an examination subject lying in a measurement field 5, the measurement system, consisting of the X-ray source 9 and the detector 2, rotates around a system axis 6. The detector signals thereby formed are supplied to a computer 7, which calculates an image of the examined volume of the patient, this image being reproduced on a monitor 8. For volume scanning, there ensues a relative motion in the direction of the system axis 6 (z-direction) between the measurement system and the examination subject lying in the measurement field 5.

Definition of the Geometry

FIG. 1 schematically explains the geometry of the basic multi-row detector computed tomography apparatus. The detector 2 is fashioned as a cylinder surface. The radius of this cylinder is $R_f + R_d$. The focus 1 lies on the cylinder axis. The detector 2 and the X-ray source 9 are connected rigidly with one another. During exposure, the X-ray source 9 moves in relation to the subject to be examined along a spiral path with radius $R_f$. The distance of the detector 2 from the rotational center is $R_d$.

The projection angle is designated $\alpha$. Inside a projection, a beam is unambiguously determined by its parameters $\beta$ and $\zeta_{Der}$. $\beta$ is the fan angle of the beam, and $\zeta_{Det}$ is the z position of the detector element belonging thereto, relative to the z position of the focus.

$$\zeta_{Der} = z_{Der} - z_F(\alpha) \tag{1}$$

The spiral-shaped focus path has slope s and is given by $$z_F(\alpha) = z_{F,0} + \alpha \cdot s. \quad (2)$$

$z_{F,0}$ is the z position of the spiral for $\alpha=0$.

Since, of course, only discrete measurement values can be recorded by the system, $\alpha$, $\beta$ and $\zeta_{Det}$ are discrete:

$$a_n = n\Delta\alpha, \text{ with } \Delta\alpha = \frac{2\pi}{N_{p,2\pi}} \text{ and } n = 0 \ldots (N_p - 1), \quad (3)$$

$$\beta_m = (m + 0.5 + AM)\Delta\beta, \text{ with } m = -\frac{N}{2} \ldots \left(\frac{N}{2} - 1\right), \text{ and} \quad (4)$$

$$\zeta_{Det,q} = \left(q - \frac{N_{rows}}{2} + 0.5 + AQ\right)\Delta\zeta_{Det}, \quad (5)$$

with $q = 0 \ldots (N_{rows} - 1)$, and wherein $\Delta\alpha$ is the projection angle increment between successive projections. $N_{P,2\pi}$ is the number of projections recorded during a complete rotation. $N_P$ is the number of total projections present, and N is the number of channels per row. For simplicity, the following observations are limited to the case of even-numbered N. AM is the alignment in the fan angle.

$\Delta\zeta_{Det}$ is the distance of two detector rows in the z direction, $N_{rows}$ is the number of detector rows, and AQ is a possible alignment in the z direction. The coordinate $\zeta_{Det}$ scaled in the rotational center, is designated $\zeta$. Thus, $$\zeta = \zeta_{Det} \frac{R_f}{R_f + R_d}.$$

The beam measured at $\alpha_n$, $\beta_m$ and $\zeta_{Det,q}$ has the measurement value $p(\alpha_n, \beta_m, \zeta_{Det,q})$, abbreviated $p(n,m,q)$.

Figure 2:
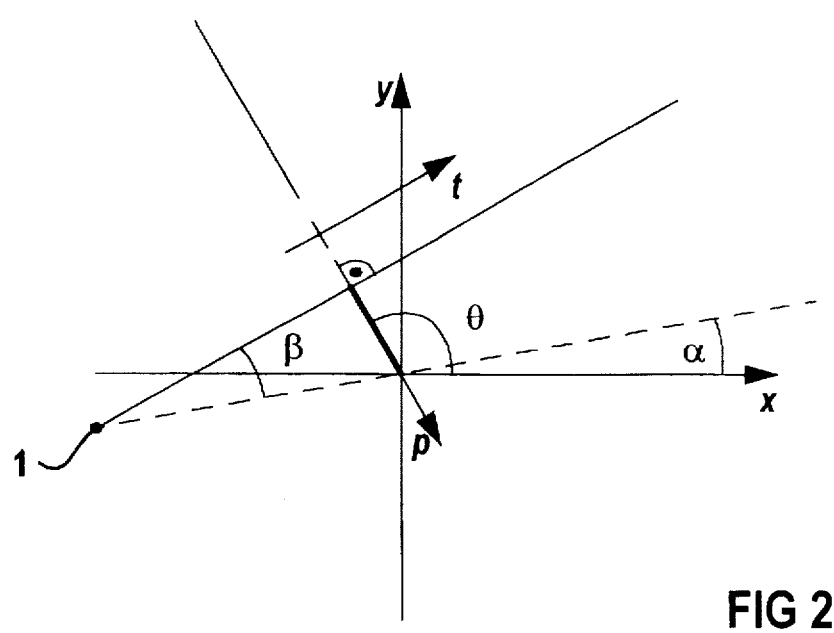
FIGS. 2 through 4 show geometrical representations for the explanation of the inventive image reconstruction method in the computed tomography apparatus of FIG. 1.

FIG. 2 shows the projection of the arrangement from FIG. 1 into the x-y plane. The two variables $\alpha$ and $\beta$ unambiguously identify the projection of a beam into this plane. The same aim is also fulfilled by the two variables $\theta$ and p, which are related to $\alpha$ and $\beta$ via the two following equations:

$$\theta = \alpha + \beta + \frac{\pi}{2}, \text{ and} \quad (6)$$

$$p = -R_f \sin\beta. \quad (7)$$

While $\alpha$ and $\beta$ are used for the description of the beams in fan geometry, the parameters $\theta$ and p serve for the description of the beams in parallel geometry, after the execution of the rebinning explained in the following, in which reinterpolation from fan geometry to a specific parallel geometry takes place.

Rebinning

In this first processing step of the method, the multi-row fan data are resorted into parallel data and are reinterpolated. This step is carried out for all detector rows independently of one another. The inclination of the beams, as well as their respectively different z-position, is thereby neglected, i.e. the beams are first treated as if they were measured in a two-dimensional CT apparatus in a plane z=constant. The position and orientation to be allocated to the produced parallel beams is not calculated until later, on the basis of the precise geometrical position and orientation of the original beams.

In the following, the rebinning is explained in more detail on the basis of FIG. 2. A beam in parallel geometry is given by $\theta$ and p. In the parallel projections, there are scanning values at the discrete points:

$$p_k = (k + 0.5 + AK)\Delta p, \text{ with } k = -\frac{N^{par}}{2} \ldots \left(\frac{N^{par}}{2} - 1\right), \text{ and} \quad (8)$$

$$\theta_l = l\Delta\theta, \text{ with } l = 0 \ldots (N_p^{par} - 1) \quad (9)$$

whereby usually $N^{par}$ is set equal to N and $N_p^{par}$ is set equal to $N_p$, i.e. the same number of parallel projections is calculated with the same number of channels as in fan geometry.

Here the term parallel projection designates a set of parallel beams with equal $\theta_l$ and q.

The rebinning is essentially described by (6) and (7). Solving these equations supplies a prescription for the selection of the fan beams that correspond to sought parallel beams. The following is obtained:

$$\hat{\beta} = -\arcsin\left(\frac{p_k}{R_f}\right), \text{ and} \quad (10)$$

$$\hat{\alpha} = \theta_l - \frac{\pi}{2} - \hat{\beta}. \quad (11)$$

In addition, the following is set:

$$q = \text{constant} \quad (12)$$

The desired scanning values in the parallel projections can be calculated on the basis of the equations (10), (11) and (12).

The calculation of a parallel data set $p(\theta_l, p_k, q)$ or, abbreviated, $p(l, k, q)$, from the fan data $p(n, m, q)$ is completed as follows:

First, the indices $\tilde{n}$, $\tilde{m}$ and $\tilde{q}$ of the fan beam are calculated from equation 10 and 11, corresponding to the beam l, k, q in parallel geometry. There results:

$$\tilde{n} = (\hat{\alpha}/\Delta\alpha)$$

and $$\tilde{m} = (\hat{\beta}/\Delta\beta) - 0.5 - AM$$

as well as $$\tilde{q} = q.$$

Since in general $\tilde{n}$ and $\tilde{m}$ are not integer numbers, interpolation between the closest neighbors must take place. For the special case of bilinear interpolation, with $$n_{lo} = \text{floor}(\tilde{n}), n_{hi} = \text{ceil}(\tilde{n})$$

$$m_{lo} = \text{floor}(\tilde{n}), m_{hi} = \text{ceil}(\tilde{n})$$

one obtains $$p(l,k,q) = (n_{hi} - \tilde{n})[(m_{hi} - \tilde{m})p(n_{lo}, m_{lo}, q) +$$
$$(\tilde{m} - m_{lo})p(n_{lo}, m_{hi}, q) +$$
$$(\tilde{n} - n_{lo})[(m_{hi} - \tilde{m})p(n_{hi}, m_{lo}, q) +$$
$$(\tilde{m} - m_{lo})p(n_{hi}, m_{hi}, q)]$$

In the following, the position and orientation of the produced parallel beams is determined.

The p-t coordinate system in FIG. 2 is rotated, in relation to the x-y system, around the z-axis by the angle $\theta$-$\pi$. p designates the position of a beam inside a parallel projection. t designates a position on a beam, i.e. t is a coordinate in the beam longitudinal direction. The point t=0 corresponds to the point of intersection of the beam with a straight line that is perpendicular both to the beam and to the z-axis, i.e., the point t=0 is that point on the beam with the smallest distance to the z-axis. The z-position of a beam at t=0 is a parameter that further describes the position of the beam. This is designated by $z_{t=0}$ and is given by $$z_{t=0}(\theta_l,p_k,q) = z_F(\theta_l,p_k) + \zeta_q \sqrt{1 - \frac{p_k^2}{R_f^2}}. \quad (13)$$

wherein $z_F(\theta_l,p_k)$ is the focus z position of the beams $(\theta_l,p_k)$ This can be calculated by putting (10) into (11):

$$\hat{\alpha} = \theta_l - \frac{\pi}{2} + \arcsin\left(\frac{p_k}{R_f}\right), \quad (14)$$

and then applying (2). The result is:

$$z_F(\theta_l,p_k) = z_{F,0} + s \cdot \left(\theta_l - \frac{\pi}{2} + \arcsin\left(\frac{p_k}{R_f}\right)\right). \quad (15)$$

Due to the arcsin term, the z-position of the beams inside a parallel projection is channel-dependent. All the beams of a parallel projection, however, have the same cone angle (this is the angle of the beams in relation to the x-y plane). From the parallel projections, thus produced, an image is now reconstructed as follows.

Definition of the Reconstruction Prescription

The projections of all the beams of the parallel projections to the angles $\theta=\theta_{l_0}+v\pi$ (v is an arbitrary integer-number) into the imaging plane are parallel, whereby the beam direction for even-numbered v is opposed to that for odd-numbered v. In the calculation of the image, we thus sum only over a half rotation (projection angle range $\theta_{l_0}=0 \ldots \pi$, i.e. $l_0=0 \ldots (N^{par}_{p,\pi}-1)$), but take into account, for a all$_{l_0}$ parallel projections with $\theta=\theta_{l_0}+v\pi$ for all v and q.

Figure 3:
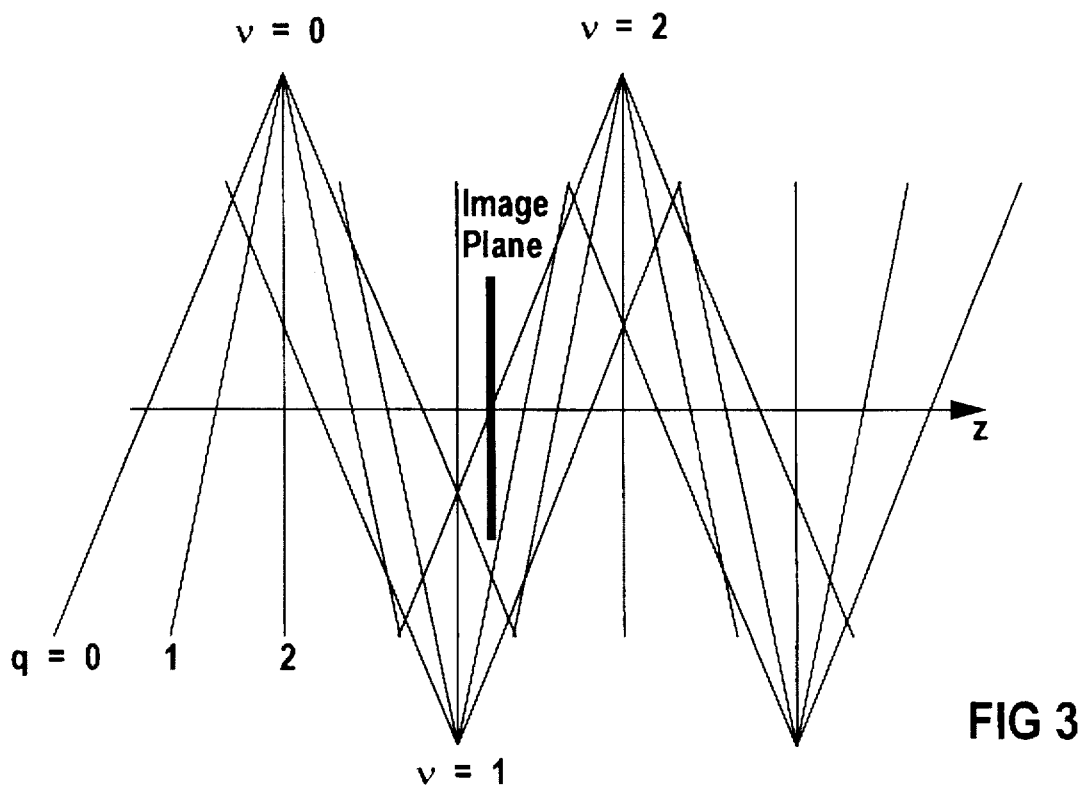

FIG. 3 illustrates a scanning pattern of a multi-row detector as a section along the z-axis, i.e., the plane of the drawing is the z-t plane. The beams represented are those at $p_k=0$. Similar to many other approximative methods, in the definition of the image to be reconstructed, the weight with which a beam contributes to the image is supposed to depend on the distance in the z-direction of the beam to the imaging plane. In general, however, this distance changes along a beam, so that the weight with which a beam contributes to the imaging plane likewise varies in the longitudinal beam direction. By providing and summing together, for a fixed $l_0$, all contributing parallel projections $p(\theta_{l_0}+v\pi,p_k,q)$ (for all (v,q)) with their associated weighting functions, a weighted average is obtained from these parallel projections, with weights that vary both in the longitudinal beam direction and in the channel direction. This averaged parallel projection is used as an approximation of a parallel projection measured completely in the imaging plane under the projection angle $\theta_{l_0}$. For normalization, the weighting functions must be created so that the weights of all beams to be summed together respectively complement each other with regard to a sum of value one. The normalized weighting function $h_n(\ )$ to be used on a particular parallel projection results when the distance-dependent weighting function $h(\ )$ is divided by the sum of all contributing weights:

$$h_n(t,p,z_{img},l_0,v,q) = \frac{h(d_z(t,p,z_{img},l_0,v,q))}{\sum\limits_{v',q'} h(d_z(r(v') \cdot t, r(v') \cdot p, z_{img}, l_0, v', q'))} \quad (16)$$

Because the orientation of the parallel projections for even or odd v is directly opposed, the two coordinate directions p and t must be rotated for one of the two cases. This is done by r(v). The following is valid:

$r(v)=1$ for even v, $r(v)=-1$ for odd v. $\quad (17)$

In order to simplify the notation, modified projections and weighting functions are used in which the coordinate directions are reversed for odd v.

$$\bar{h}_n(t,p,z_{img},l_0,v,q)=h_n(r(v)t,r(v)p,z_{img},l_0,v,q) \quad (18)$$

$$\bar{p}(\theta_{l_0}+v\pi,p,q)=p(\theta_{l_0}+v\pi,r(v)p,q) \quad (19)$$

The distance of the beam in the z-direction from the imaging plane at $z_{img}$ is thereby given by $$d_z(t,p,z_{img},l_0,v,q) = z_{t=0}(\theta_{l_0}+v\pi,p,q) + \frac{t}{R_f}\zeta_q - z_{img}. \quad (20)$$

Using this averaged parallel projection, a standard parallel back-projection image can now be defined:

$$f(x,y) = \frac{2}{\pi \Delta_p N^{par}_{p,\pi}} \sum_{l_0} \sum_k \left[\sum_{v,q} \bar{h}_n(t,p,z_{img},l_0,v,q)\bar{p}(\theta_{l_0}+v\pi,p_k,q)\right] \times \quad (21)$$

$$L(-x\cos\theta_{l_0} - y\sin\theta_{l_0} - p_k)$$

The term in square brackets is the averaged parallel projection.

The dependence on t in $\bar{h}_n(\ )$ takes into account the inclination of the beams by their respective cone angle. The evaluation of the previous equation would require the following steps:

Weighted summation over v and q for all t

Convolution of the weighted sums with $L(\ )$

Supplement to the observed voxel x, y, z.

Since the t-dependence and the p-dependence in $\bar{h}_n(\ )$ cannot be separated, the order of summation over (v, q) and convolution over k cannot be changed. Thus, to be exact, a separate convolution must be carried out for each t, and thereby for each pixel. The computing expense for this, however, is too high for a practical application. If the convolution is nonetheless carried out before the weighted summation, the interpolation can ensue in the z direction during the back-projection, however, an error is introduced. The inventive method avoids the impermissible change of order of weighted summation and convolution without the consequence of a high computing expense. The method does without the expensive cone beam back-projection, and nonetheless takes into account the cone angle of the beams.

By considering periodic repetitions of the convoluted averaged projection, the result is achieved that the spectrum is discrete in the channel direction. In the region of interest, the image is not affected by this periodic repetition, if it is assumed that the convoluted projections have finite extension and the period w is chosen correspondingly. The result is:

$$f(x,y) = \frac{2}{\pi \Delta_p N^{par}_{p,\pi}} \sum_{l_0} \sum_\eta \sum_k \left[\sum_{v,q} \bar{h}_n(t,p,z_{img},l_0,v,q)\bar{p}(\theta_{l_0}+v\pi,p_k,q)\right] \times \quad (22)$$

$$L(-x\cos\theta_{l_0} - y\sin\theta_{l_0} - p_k - \eta w)$$

Within a parallel projection, $\bar{h}_n(\ )$ is a one-dimensional function of t that is different for each channel $p_k$. A different function $\bar{h}_n(t,\ldots)$ is thus obtained, which can be calculated and stored in advance, for each imaging plane $z_{img}$ and for each value v, q and $p_k$. Instead of storing a table of function values, the weighting function is approximated with a Fourier series and the Fourier coefficients are stored. Due to the specific symmetry characteristics of the spiral-shaped focus path, this table does not have to be stored for different projection angles. This is because a change of the projection angle corresponds to a change in $z_{img}$. In the following, it is explained how (22) can be implemented in the frequency domain, leading to a Fourier reconstruction.

Implementation in the Frequency Domain

First the weighting functions are approximated, as mentioned above, by means of Fourier series:

$$\bar{h}_n(t,p,z_{img},l_0,v,q) = \sum_{-N_u}^{N_u} c_\mu(p,z_{img},l_0,v,q) e^{j2\pi\mu \frac{t}{\Omega}} \quad (23)$$

The weighting functions thereby become periodic. The periods $\Omega$ must be suitably chosen.

If (23) is put into (22), the following is obtained:

$$f(x,y) = \frac{2}{\pi\Delta_p N_{p,\pi}^{per}} \sum_{l_0} \sum_{\eta} \sum_{k} \quad (24)$$

$$\sum_{v,q} \sum_\mu c_\mu(p_k,z_{img},l_0,v,q) e^{j2\pi\mu \frac{t}{\Omega}} \bar{p}(\theta_{l_0} + v\pi,p_k,q)$$

$$L(-x\cos\theta_{l_0} - y\sin\theta_{l_0} - p_k - \eta w)$$

In this form, the spectrum of the image is easy to calculate by means of two-dimensional Fourier transformation. The following is obtained:

$$\hat{f}(p_x,p_y) = \frac{2/w}{\pi\Delta_p N_{p,\pi}^{per}} \sum_{l_0} \sum_\eta \sum_\mu \sum_k \sum_{v,q} c_\mu(p_k,z_{img},l_0v,q) \cdot \quad (25)$$

$$\bar{p}(\theta_{l_0} + v\pi,p_k,q) e^{-j2\pi \frac{\eta}{w} p_k} \hat{L}\left(\frac{\eta}{w}\right)$$

$$\delta_0\left(p_x + \frac{\eta}{w}\cos\theta_{l_0} - \frac{\mu}{\Omega}\sin\theta_{l_0}\right) \delta_0\left(p_y + \frac{\eta}{w}\sin\theta_{l_0} + \frac{\mu}{\Omega}\cos\theta_{l_0}\right)$$

The evaluation of this equation includes the following steps:

A multiplication of the projections $\bar{p}(\theta_{l_0}+v\pi,p_k,q)$ with the weighting coefficients $c_\mu(p_{k,zimg},l_0,v,q)$ is made and a summation is made over all contributing (v,q).

A Fast Fourier Transformation (FFT) is undertaken, along the $p_k$ direction, of the weighted sum, for all $\mu$.

The spectrum produced in this way is multiplied with $\hat{L}(.)$, again for all $\mu$.

The above steps are to be carried out for all $l_0$.

Figure 4:
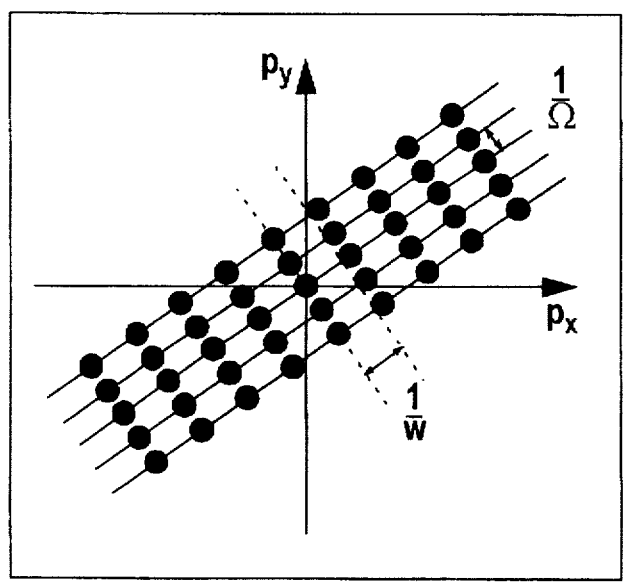

FIG. 4 shows the spectrum of a single averaged projection at a particular projection angle. The spectrum of the image results by superposition of all these contributions over a half rotation.

The resulting spectrum can be reinterpolated into a Cartesian grid by means of various techniques (e.g. H. Schomberg, J. Timmer: "The Gridding Method for Image Reconstruction by Fourier Transformation," IEEE Transactions on Medical Imaging, vol. 14, no. 3, September 1995), and then transformed back into the spatial domain by means of a two-dimensional inverse FFT to produce an image of the examination subject.

Although modifications and changes may be suggested by those skilled in the art, it is the intention of the inventor to embody within the patent warranted hereon all changes and modifications as reasonably and properly come within the scope of his contribution to the art.

We claim as our invention:

1. An approximative method for image reconstruction in a computed tomography apparatus, comprising the steps of:

conducting a spiral scan of an examination subject containing an image plane, by rotating a pyramid-shaped X-ray beam containing a plurality of fan beams and a multi-row x-ray detector through a plurality of projection angles around a longitudinal axis disposed perpendicularly to said image plane, to obtain fan data respectively from fan beams attenuated by said subject striking said detector;

reinterpolating said fan data by rebinning to obtain parallel data independently for each row of said detector;

approximating a weight, by a Fourier series, for a contribution made by each of said beams to the image as a function of a distance of said beam from said image plane;

synthesizing the frequency spectra of averaged parallel projections by summing up all contributing parallel projections multiplied with their respective weighting Fourier coefficients and subsequently performing FFTs along the direction of the channels generating the overall spectrum by summing overall projection angles producing a Cartesian frequency grid from said overall spectra and back-transforming said Cartesian frequency grid into the spatial domain to form an image of said examination subject in said image plane.

* * * * *